United States Patent [19]

Onda

[11] 4,223,567
[45] Sep. 23, 1980

[54] POWER TRANSMISSION APPARATUS

[75] Inventor: Takanori Onda, Kawagoe, Japan

[73] Assignee: Honda Giken Kogyo Kabushiki Kaisha, Tokyo, Japan

[21] Appl. No.: 25,063

[22] Filed: Mar. 29, 1979

[30] Foreign Application Priority Data

Apr. 3, 1978 [JP] Japan .................. 53-42455
Apr. 28, 1978 [JP] Japan .................. 53-57808

[51] Int. Cl.² ........................................... F16H 57/02
[52] U.S. Cl. .................................... 74/606 R; 74/413; 123/195 A
[58] Field of Search .................... 74/11, 15, 63, 401, 74/701, 397, 331, 333, 606 R, 413; 123/192 R, 192 B, 195 R, 195 A, 198 R, 198 E; 64/3; 92/147, 148, 161, 261

[56] References Cited

U.S. PATENT DOCUMENTS

| | | | |
|---|---|---|---|
| 2,391,783 | 12/1945 | Jacobi | 74/333 |
| 3,021,715 | 2/1962 | DeLorean et al. | 74/606 R X |
| 3,106,195 | 10/1963 | Hanley | 123/192 B X |
| 3,710,774 | 1/1973 | Weseloh et al. | 123/192 B |
| 3,759,238 | 9/1973 | Irgens | 123/192 B |
| 3,763,948 | 10/1973 | Eggleton et al. | 74/606 R X |
| 3,859,870 | 1/1975 | Whateley | 74/331 X |
| 4,000,666 | 1/1977 | Ito et al. | 123/192 B X |

FOREIGN PATENT DOCUMENTS 4944442 7/1972 Japan .

Primary Examiner—Leslie Braun
Assistant Examiner—Moshe I. Cohen
Attorney, Agent, or Firm—Haseltine, Lake & Waters

[57] ABSTRACT

A power transmission apparatus of the type having a crankshaft of an internal combustion engine and an intermediate driving shaft to be driven by the crankshaft. Input and output shafts of a gear transmission to be driven by the driving shaft are so provided in an outer surrounding machine casing as to be arranged in parallel rows to one another. The four shafts are positioned, at their axial lines, in a common plane, and the machine casing is so constructed as to be divisible at that plane into upper and lower half portions.

2 Claims, 6 Drawing Figures

POWER TRANSMISSION APPARATUS

BACKGROUND OF THE INVENTION

The present invention relates to a power transmission apparatus used chiefly in a motorized two-wheeled vehicle such as a motorcycle or the like, for transmitting an output of an internal combustion engine to the wheel.

It has previously been proposed that in an apparatus of this kind, a crankshaft of an internal combustion engine, an intermediate driving shaft to be driven by the same, and input and output shafts of a gear transmission to be driven by the driving shaft are so arranged within a surrounding machine casing as to be in parallel rows one to another. In this case there has been an attempt to make an assembling work thereof simple and easy.

Further, it has been usual hitherto with this kind of apparatus that a starter means and an electric generator means which are comparatively large in weight were both provided only on one side of a longitudinal center line of the machine casing. This conventional one-sided arrangement causes the apparatus to become heavier on one side thereof, so that when the apparatus is mounted on a body of a motorized two-wheeled vehicle such as a motorcycle or the like, it is very difficult for the center of gravity of the vehicle be positioned on a center line connecting between the front wheel and the rear one of the vehicle, and for fulfilling this requirement, the apparatus has to be mounted thereon in such a condition that the same is biased on one side.

SUMMARY OF THE INVENTION

The main object of the present invention is to overcome the defects of the prior art.

Another object of the present invention is to provide an apparatus meeting the above requirement, and in such a type of apparatus that a crankshaft of an internal combustion engine, an intermediate driving shaft to be driven by the same, and input and output shafts of a gear transmission to be driven by the driving shaft are so provided in an outer surrounding machine casing as to be arranged in parallel rows to one another. The apparatus has four shafts positioned, at their axial lines, in a common plane; the machine casing is so constructed as to be divisible at that plane into upper and lower half portions.

An additional feature of this invention is an apparatus free from the foregoing inconvenience, and it is characterized in that, in the foregoing type of apparatus, where, a starter means and an electric generator means are disposed, respectively, on one side and on the other side of a longitudinal center line of the machine casing.

The invention will be better understood with respect to the accompanying specification, claims and drawings.

BRIEF DESCRIPTION OF DRAWNGS

DETAILED DESCRIPTION

Figure 1:
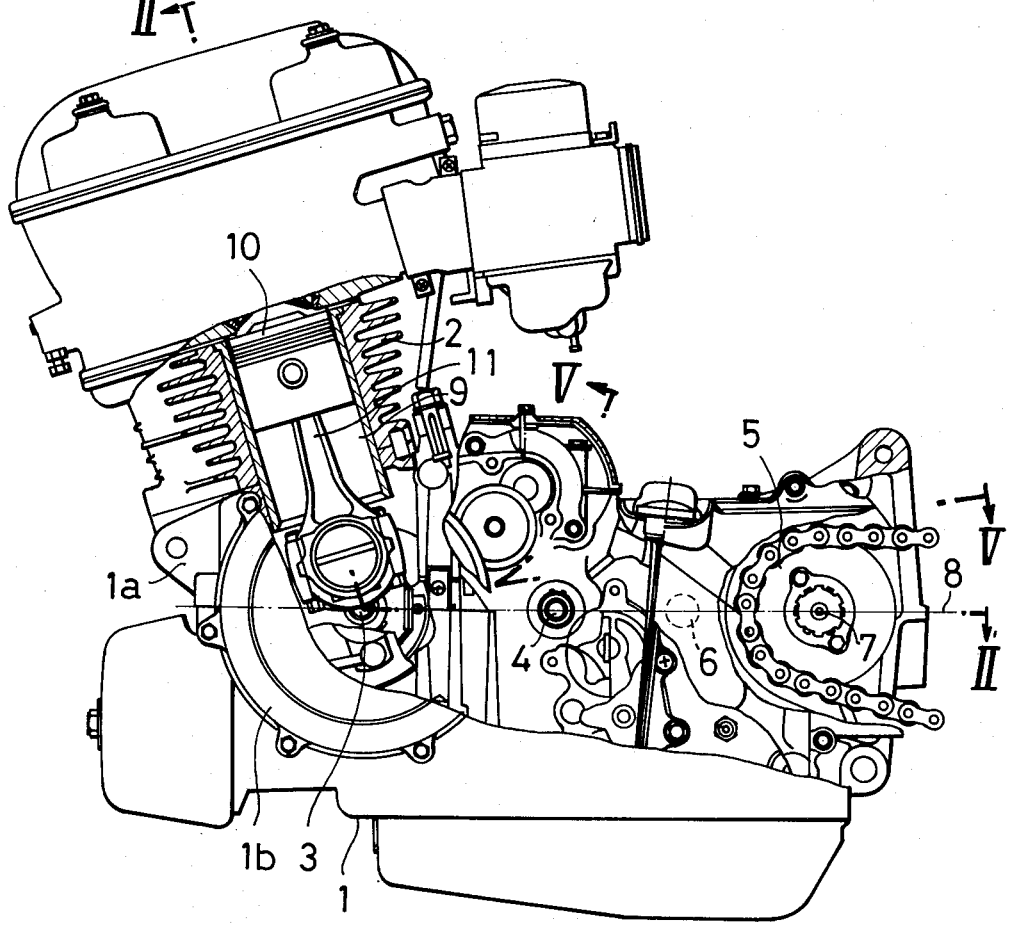
FIG. 1 is a side view, partly in section, of one example of the inventive apparatus.
Figure 3:
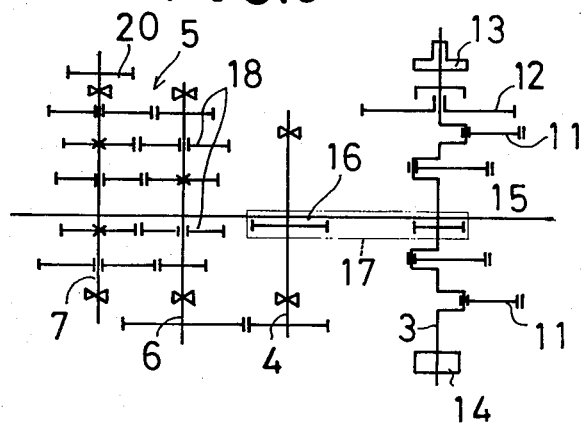
FIG. 3 is a diagrammatical top plane view for explaining a power transmission system thereof.
Figure 2:
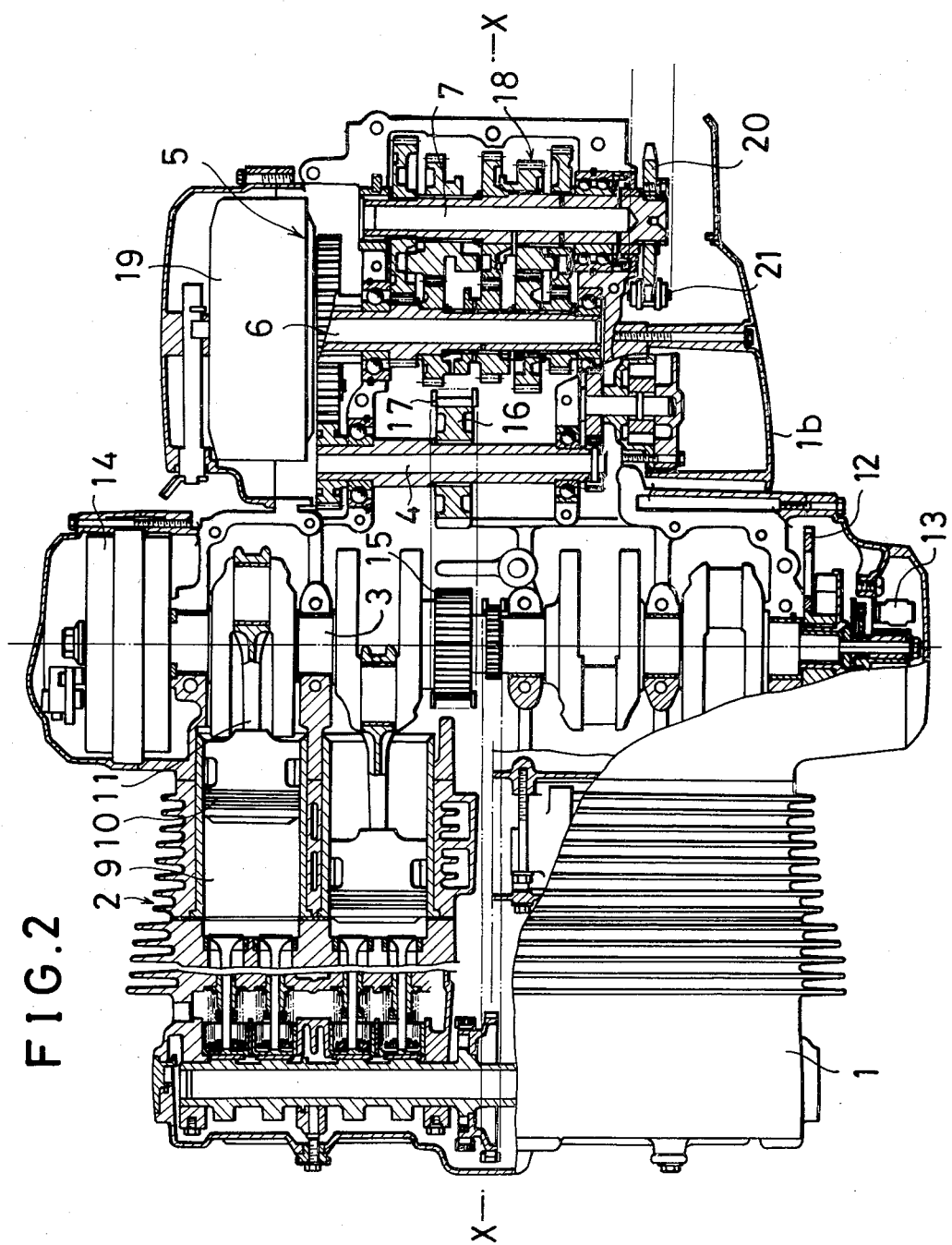
FIG. 2 is a sectional view taken along the line II—II of FIG. 1.
Figure 4:
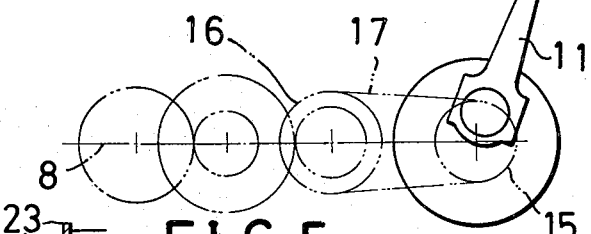
FIG. 4 is a diagrammatical side view of the same.
Figure 5:
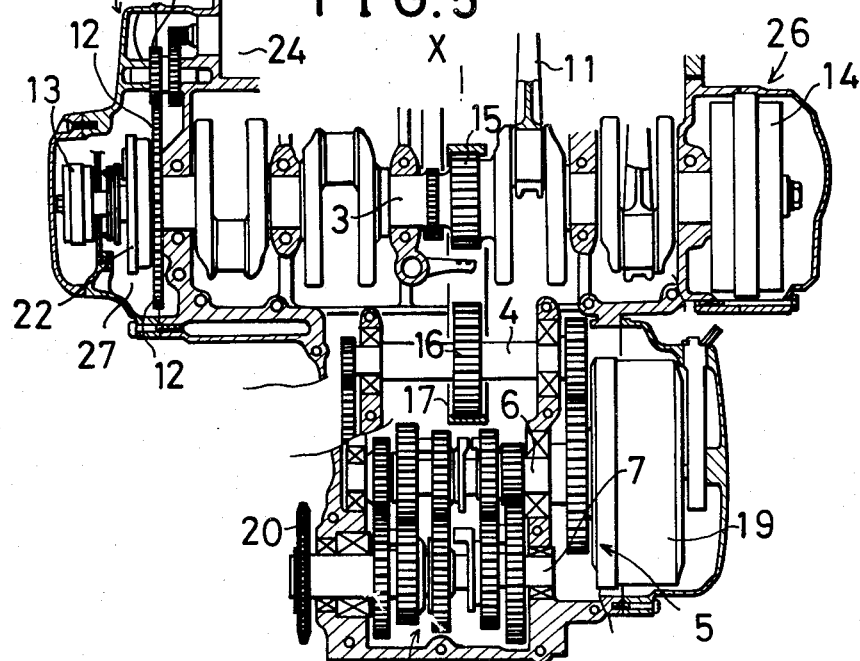
FIG. 5 is a sectional view taken along the line V—V in FIG. 1.
Figure 6:
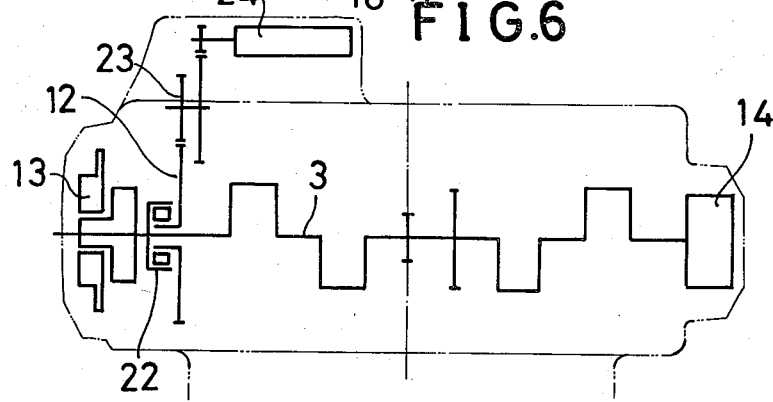
FIG. 6 is an explanation diagram thereof.

Referring to the drawings, numeral 1 denotes an outer surrounding machine casing, and a crankshaft 3 of an internal combustion engine 2, an intermediate driving shaft 4 to be driven by the crankshaft 3, and input and output shafts 6 and 7 of a gear transmission 5 to be driven by the shaft 4 are so provided in the machine casing 1 as to be arranged in parallel rows to one another. In this case, the four shafts 3, 4, 6, 7 are positioned, at their axial lines, in a common plane 8, and the machine casing 1 is so constructed as to be divisible at that plane 8 into an upper half portion 1a and a lower half portion 1b. More in detail, the engine 2 is of such a four-cylinder type that four cylinders 9 are arranged in parallel, and a piston 10 in each cylinder 9 is connected through a connecting rod 11 to the crankshaft 3. The crankshaft 3 is provided on one end portion thereof, with starter gear 12 and a governor for ignition 13. On the other end portion thereof, a rotor 14 of an A.C. generator is provided and the same is connected at a sprocket 15 on its middle portion through a chain 17 to a sprocket 16 on the intermediate driving shaft 4 in the rear of the crankshaft 3. Furthermore, the input shaft 6 and the output shaft 7 of the gear transmission 5 are interconnected through plural gear trains 18 so that the transmission 5 may be varied in speed rate. The gear transmission 5 is connected at a clutch 19 on one end portion of the input shaft 6 to the intermediate driving shaft 4, and is also connected at a sprocket 20 on one end portion of the output shaft 7 through a chain 21 to the rear wheel or the like. The foregoing two half portions 1a and 1b are put one upon another at the dividing plane 8 and are combined together by means of bolts, and the upper and lower half portions 1a, 1b are formed, at portions corresponding to respective end portions of the foregoing shafts 3, 4, 6, 7 with respective semicircular recess surfaces for constituting respective bearing surfaces.

At the time of assembling those parts into the inventive apparatus, the upper half portion 1a of the machine casing 1 is set so that its opening surface may direct upwardly, and then the crankshaft 3, the intermediate driving shaft 4, the input shaft 6 and the output shaft 7 are mounted on the same from the above. Prior to this mounting operation, the respective shafts 3, 4, 6, 7 are associated with necessary respective parts. Thereafter, the lower half portion 1b of the machine casing 1 is applied thereto from above and is secured thereto by means of bolts or the like. Then the whole is turned over upsidedown and thus producing the product.

Furthermore, the foregoing starter gear 12 is connected through a one-way clutch 22 on the outer side thereof to the crankshaft 3 and is also connected through a reduction gear train 23 to a starter motor 24 on the upper side thereof, so that a starter means 25 is constructed as a whole.

The foregoing rotor 14 is provided with a starter as in a known manner, so that an electric generator means 26, i.e. an A.C. generator or the like, is constructed. Thus, the starter means 25 and the generator means 26 which are comparatively large in weight are disposed on one side and on the other, respectively, of the center line X—X of the machine casing 1, so that there is no imbalance in weight. The starter gear 12 and the governor for ignition 13 are exposed to the interior of a splash oil supply chamber 27 enabling lubrication by splash oil supply.

Thus, according to this invention, it is so arranged that the machine casing is once opened, and the predetermined four shafts are mounted thereon from above, and then the machine casing is closed and thus the assembly is complete. As a result, the work for assembling is made simple and is high in efficiency. Also, according to a second feature of this invention, the starter means and the generator means are comparatively large in weight and are disposed on one side and on the other side, respectively, of the longitudinal center line of the machine casing so that balance is obtained and when the apparatus is mounted on a body of a motorized two-wheeled vehicle such as a motorcycle or the like, the center line thereof can be approached as nearest as possible to the center line of the vehicle.

BEST MODE OF INVENTION

A power transmission apparatus of the type that a crankshaft of an internal combustion engine, an intermediate driving shaft 4 to be driven by the crankshaft 3, and input and outshafts 6, 7 of a gear transmission 5 to be driven by the driving shaft 4 are so provided in an outer surrounding machine casing 1 as to be arranged in parallel rows to one another, the four shafts 3, 4, 6 and 7 are positioned, at their axial lines, in a common plane, and the machine casing 1 is so constructed as to be divisible at the plane into upper and lower half portions 1a and 1b. A starter assembly 25 and an electric generator 26 are disposed on one side and the other side, respectively, of a longitudinal center line of the machine casing 1.

Many modifications and variations of the present invention are possible in light of the above teachings. It is, therefore, to be understood that within the scope of the appended claims, the invention may be practiced otherwise than as particularly described.

What is claimed is:

1. A power transmission apparatus of the type that a crankshaft of an internal combustion engine, an intermediate driving shaft to be driven by the crankshaft, input and output shafts of a gear transmission driven by the driving shaft are so provided in an outer surrounding machine casing as to be arranged in a row and parallel to one another wherein: the four shafts are positioned at their axes of rotation in a common plane, and the machine casing is so constructed as to be divisible at tht plane into upper and lower half portions.

2. An apparatus as claimed in claim 1, wherein: a starter means and an electric generator means are disposed on one side and the other side, respectively, of a longitudinal center line of the machine casing.

* * * * *